(12) United States Patent
Klemetti

(10) Patent No.: US 11,916,966 B2
(45) Date of Patent: Feb. 27, 2024

(54) ACCESS POLICY MANAGEMENT

(71) Applicant: Adaptiv Networks Inc., Gatineau (CA)

(72) Inventor: Miika Anttoni Klemetti, Kanata (CA)

(73) Assignee: Adaptiv Networks Inc., Gatineau (CA)

( * ) Notice: Subject to any disclaimer, the term of this patent is extended or adjusted under 35 U.S.C. 154(b) by 269 days.

(21) Appl. No.: 17/366,285

(22) Filed: Jul. 2, 2021

(65) Prior Publication Data

US 2023/0007045 A1    Jan. 5, 2023

(51) Int. Cl.
*H04L 9/40*    (2022.01)

(52) U.S. Cl.
CPC ............ *H04L 63/20* (2013.01); *H04L 63/029* (2013.01); *H04L 63/08* (2013.01)

(58) Field of Classification Search
CPC ....... H04L 63/20; H04L 63/029; H04L 63/08; H04L 63/10
USPC .......................................................... 726/1
See application file for complete search history.

(56) References Cited

U.S. PATENT DOCUMENTS

| | | | |
|---|---|---|---|
| 8,259,571 B1 * | 9/2012 | Raphel | H04L 61/2535 370/252 |
| 8,897,299 B2 | 11/2014 | Rao et al. | |
| 9,191,318 B1 | 11/2015 | Van de Velde et al. | |
| 9,667,538 B2 | 5/2017 | Hammam et al. | |
| 10,455,387 B2 * | 10/2019 | Nicholson | H04L 12/4641 |
| 10,798,179 B2 | 10/2020 | Hashmi | |
| 10,904,217 B2 | 1/2021 | Sullenberger et al. | |
| 2007/0106892 A1 | 5/2007 | Engberg | |
| 2007/0248085 A1 * | 10/2007 | Volpano | H04L 63/0272 370/389 |
| 2010/0191604 A1 * | 7/2010 | Raleigh | G06Q 30/04 705/16 |
| 2014/0164776 A1 | 6/2014 | Hook et al. | |
| 2019/0387403 A1 * | 12/2019 | Chennupati | H04L 63/0272 |
| 2023/0188545 A1 * | 6/2023 | Kaciulis | H04L 63/1425 726/1 |

* cited by examiner

*Primary Examiner* — Kambiz Zand
*Assistant Examiner* — Aubrey H Wyszynski
(74) *Attorney, Agent, or Firm* — Stratford Group Ltd.

(57) ABSTRACT

A system for access policy management of a plurality of valid entities communicating over a network comprising a server executing an application programming interface for registration and authentication of said entities directly or via an edge router, one or more encrypted tunnels between entities and one or more gateways. Wherein said server assigns a private IP address to each authenticated entities and propagates said IP address and associated access policies to each of said one or more gateway; and said one or more gateway processing and routing a plurality of packets received from each entity and enforcing one or more access policies associated with the private IP address assigned to the authenticated entity; and said one or more gateways manage routes based on the propagated private IP addresses of each authenticated entities and routes packets to reach one or more remote entities via one or more tunnels to one or more other gateways creating a network overlay between authenticated entities.

6 Claims, 4 Drawing Sheets

ACCESS POLICY MANAGEMENT

BACKGROUND

In order to maintain secure communications, it is necessary to police the access of entities trying to communicate through the network. FIG. 1 depicts an existing policing system where an edge router 104 performs the access policing for several entities 102 in a physical branch/office 110 in communication, over the internet 106 with remote entities 112 and other remote entities 114. The other remote entities 114 can include private clouds, physical branches/offices or simple entities. An entity 102 can be for example, but not limited to, a user, a group, a device, an application, a service, an Internet of Things device or system or an edge computing location.

Nowadays, a lot of the workflows or communications between entities 102 is cloud-based. Policing access at the edge router 104 is not performant for cloud-based workflows, especially if remote entities 112 require secure access to other remote entities 114. Hence, instead of enforcing policies only at the physical network perimeter 104, security gateways can be deployed in the cloud, protecting resources regardless of their physical location (e.g., on premises, on cloud).

Zero Trust Network Access (ZTNA) is an approach that removes assumptions and implicit trust from network access control. That is, each request to a resource is individually evaluated, based on the identity of the requesting entity, the context of the request, and risk assessments based on dynamic usage patterns. In ZTNA, belonging to a physical network does not grant access unless it is explicitly configured in the edge router 104.

In a typical Zero Trust Architecture (ZTA) the following high-level components are often implemented, where the policy enforcement at the access gateway usually resides in the cloud.
  User identity management and authentication
  Policy management
  Policy evaluation and enforcement
  Security event processing
  Dynamic risk assessment

BRIEF SUMMARY

In a first embodiment, a system for access policy management of a plurality of valid entities communicating over a network comprising:
  a server executing an application programming interface for registration and authentication of said entities;
  one or more encrypted tunnels between entities and one or more gateways;
  wherein said server assigns a private IP address to each authenticated entities and propagates said IP address and associated access policies to each of said one or more gateway; and said one or more gateway processing and routing a plurality of packets received from each entity and enforcing one or more access policies associated with the private IP address assigned to the authenticated entity; and said one or more gateways manage routes based on the propagated private IP addresses of each authenticated entities and routes packets to reach one or more remote entities via one or more tunnels to one or more other gateways creating a network overlay between authenticated entities.

In a second embodiment, an edge router is performing the authentication and registration for said entities.

In a third embodiment, a method for access policy management of a plurality of valid entities communicating over a network comprising:
  managing one or more encrypted tunnels between entities and one or more gateways;
  authenticating and registering said entities by a server;
  assigning, by said server, a private IP address to each authenticated entities and propagating said IP address and associated access policies to each of said one or more gateway; and processing and routing, by said one or more gateway, a plurality of packets received from each entity and enforcing one or more access policies associated with the private IP address assigned to the authenticated entity; and managing, by said one or more gateways, routes based on the propagated private IP addresses of each authenticated entities and routing packets to reach one or more remote entities via one or more tunnels to one or more other gateways creating a network overlay between authenticated entities.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
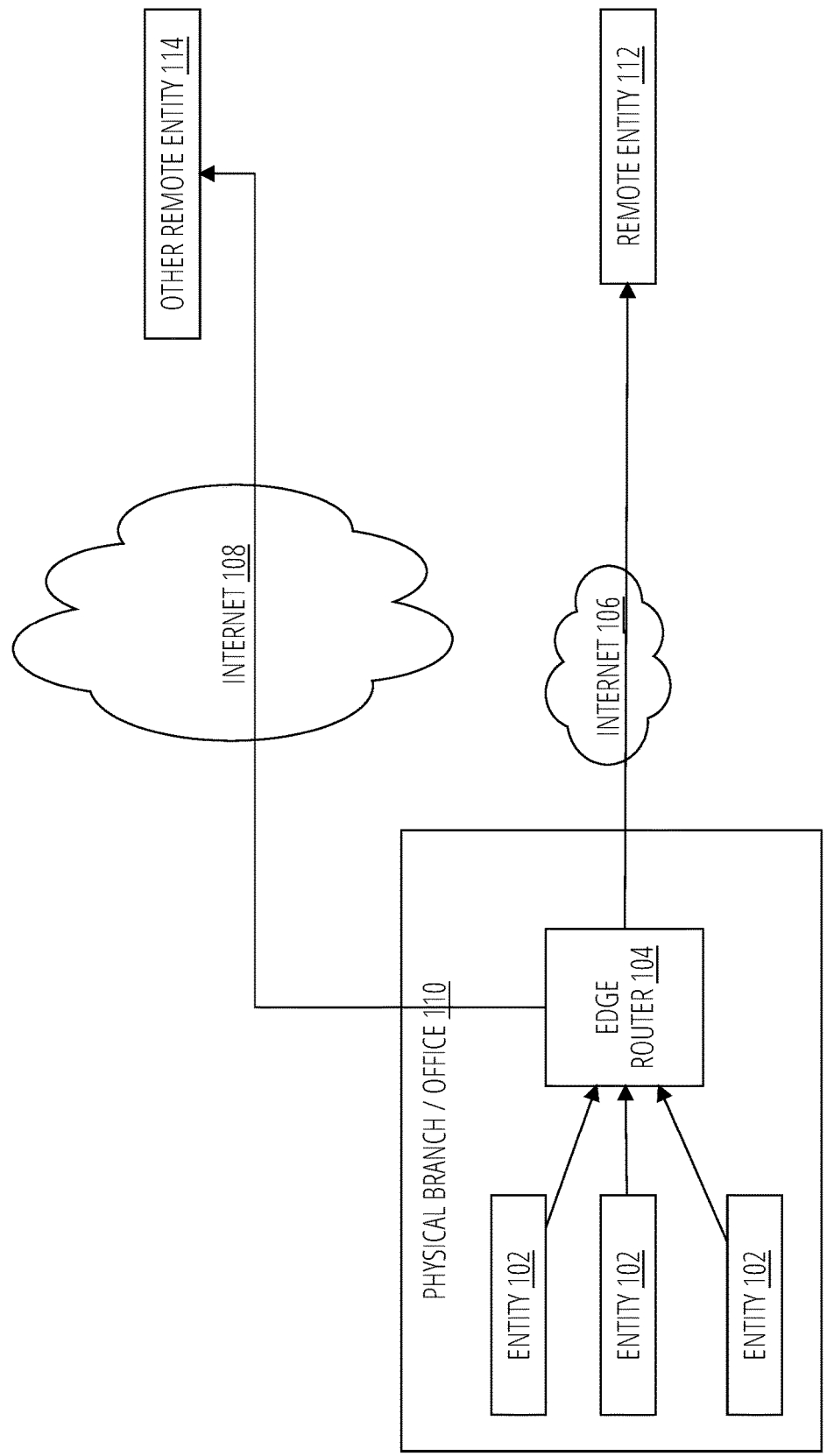
FIG. 1 illustrates existing solutions with central server.
Figure 2:
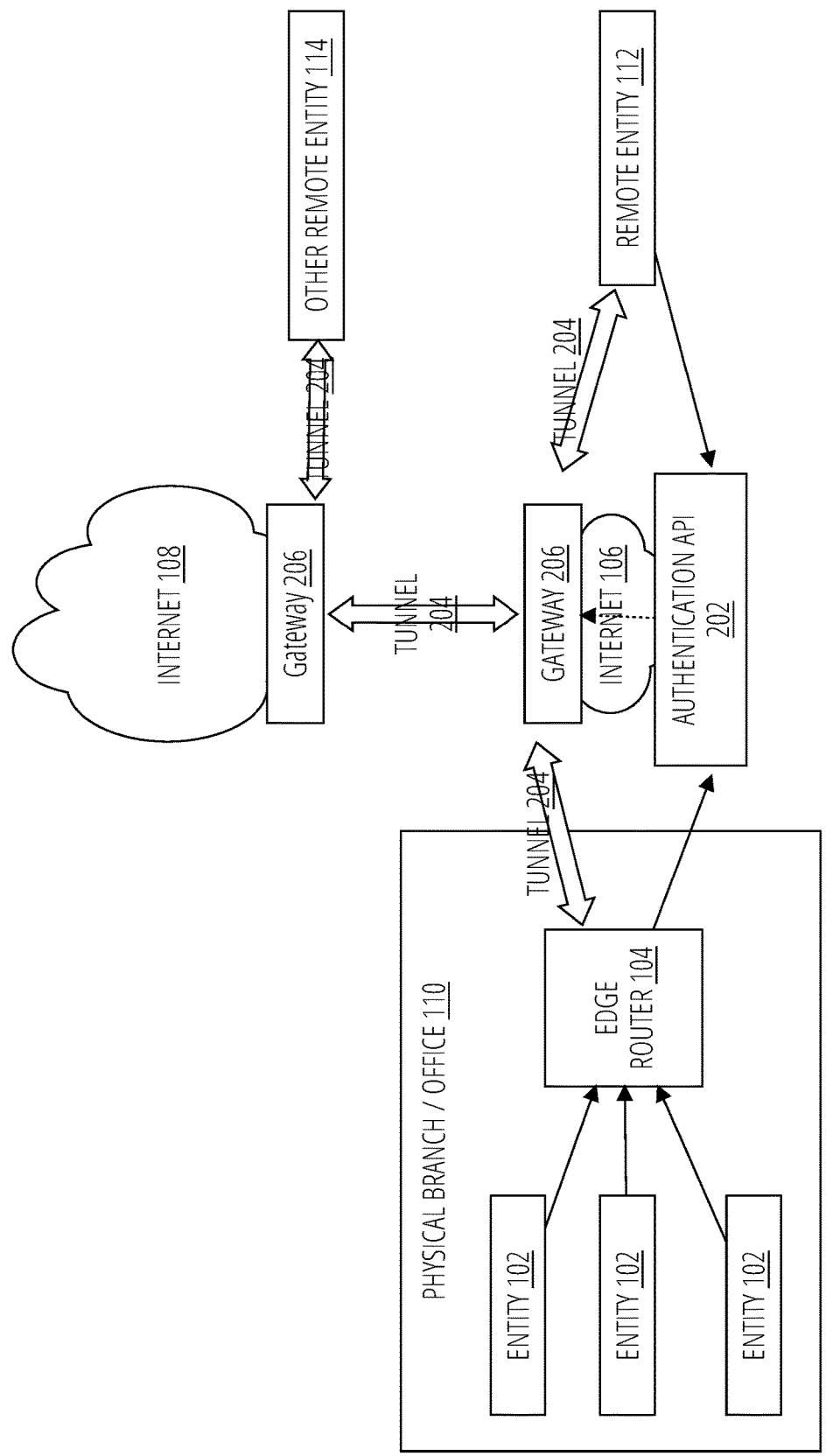
FIG. 2 illustrates an embodiment with gateways and authentication API.

FIG. 2 depicts an access policy management system comprising an authentication API 202 and one or more gateway 206. The authentication API 202 is a server that acts as the security broker. Each entity registers to the network via the authentication API 202 and is explicitly granted access to the network with zero trust. The authentication API 202 associates a private IP address to each entity 102 and configures one or more gateway 206 with access policies for each private IP addresses.

Figure 3:
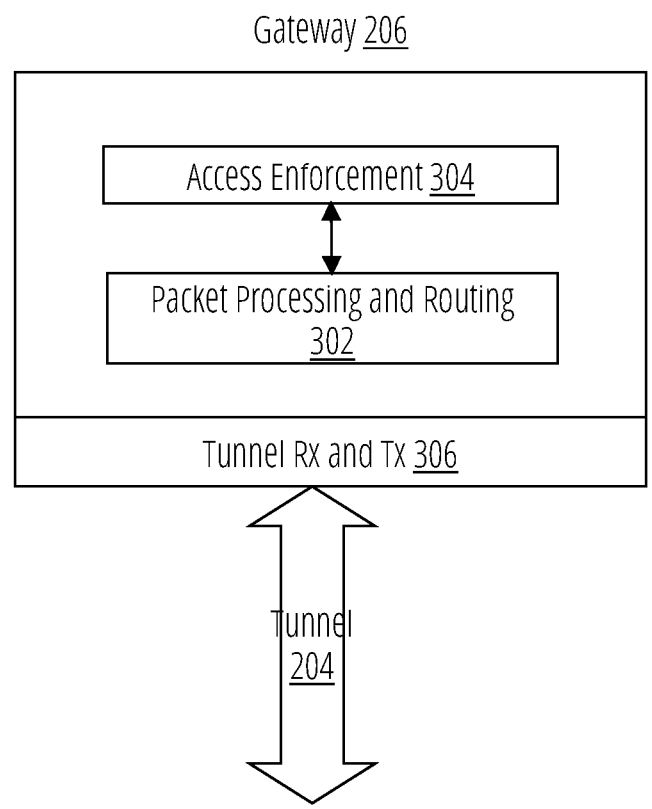
FIG. 3 illustrates an embodiment of the gateway.

As per FIG. 3, the gateway 206 performs packet processing and routing 302 as known in the art. Furthermore, the gateway 206 performs access enforcement 304 based on the private IP address and associated predetermined policies and context provided by the authentication API 202. The access from each entity 102 is monitored and the trust is continuously reassessed. The gateway 206 uses one or more encrypted tunnels 204 to carry the packets. The tunnels create an overlay network between known entities.

Figure 4:
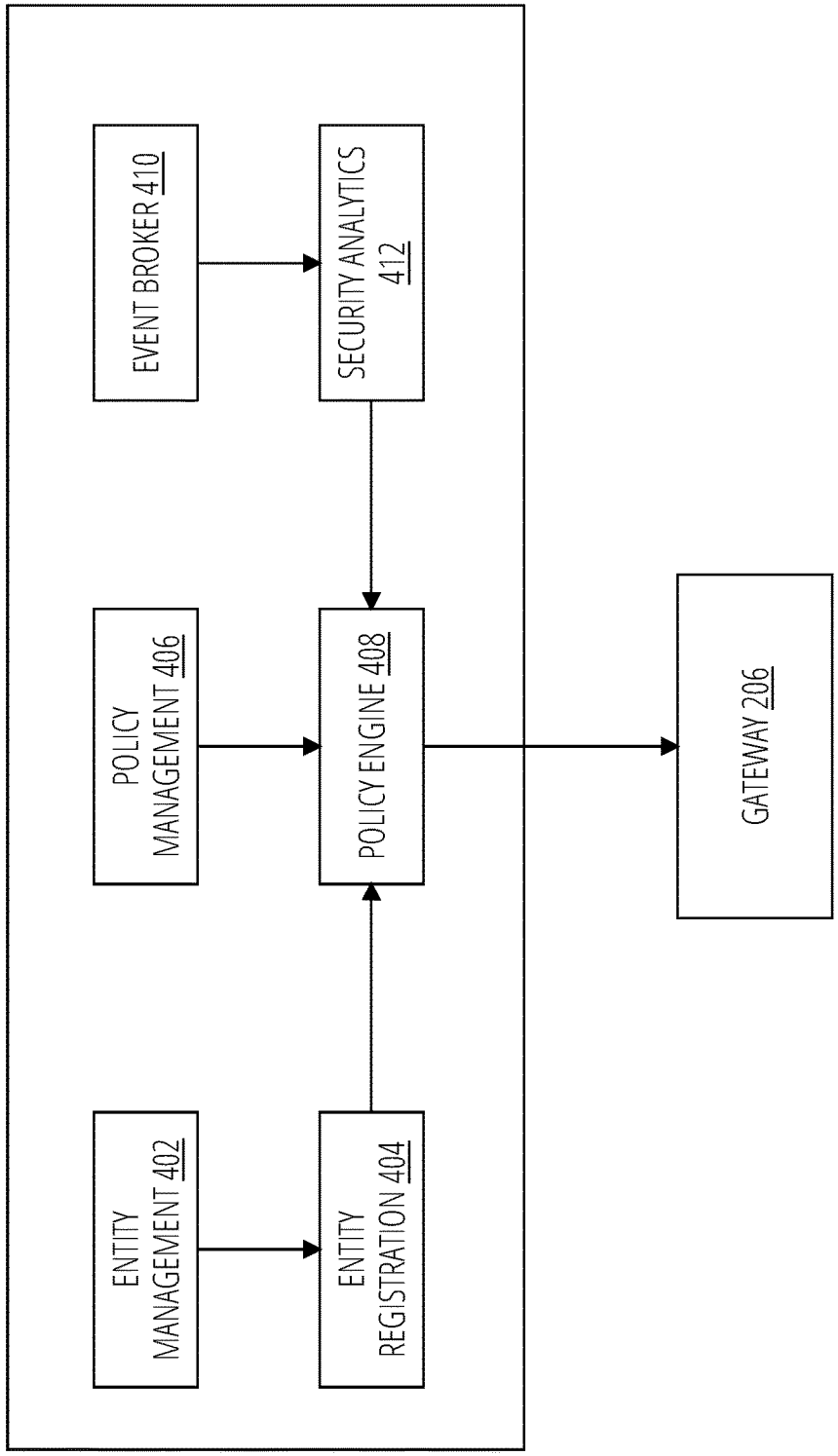
FIG. 4 illustrates an embodiment of the authentication API.

FIG. 4 depicts an embodiment of the authentication API 202. The implementation of the authentication component can be driven by open standards (e.g., OAuth, OpenID, SAML), and may interact with $3^{rd}$ party identity and authentication management (IAM) systems. Once the entity requesting network access has authenticated, the signed access token provided by the authentication service may be used to register themselves for network access.

The authentication and registration for network access is done by entities 112 directly, and by edge router 104 on behalf of entities 102. The edge router 104 may be configured to associate each LAN device with a specific user.

In one embodiment entities 102 explicitly authenticate with edge router 104 or authentication API 202 to associate their private IP address with a specific user.

In another embodiment, DHCP server configuration on the edge router 104 is used to identify each LAN device, and to assign private IP addresses to each device from a pool of IP addresses reserved by the edge router 104. As with entities 112, the private IP address is used by the gateway to enforce access policies.

Any access policy management framework known in the art can be used, such as, but not limited to, role based access control with inheritance or attribute based access control.

The one or more gateway 206 manage routes based on the propagated private IP addresses of each authenticated entities 102 said access gateway routes packets to reach each remote entity 112 via tunnels to one or more other gateways 206 to create a network overlay between authenticated entities 102.

As an example, a new employee joins a physical branch/office 110. An email address is created for the employee in the branch's IAM. The employee may now register for remote network access by providing their email and credentials to the authentication API 202. The authentication API 202 authenticates the email and associates policies based on the user's access roles. The authentication API 202 then assigns a private IP address and configures access on the gateway 206 with the appropriate policies. The packets sent by the new employees have the private IP address in the header and are carried on the tunnels of the overlay network based on the policies.

The entity management 402 and authentication API 202 allow entities to be managed via an API, with integrations to directory protocols and external identity management services.

Entity registration 404 is done by assigning a unique identifier (e.g., private IP address) to each entity 102, that will be embedded in packet encapsulation and used for identification by the data plane modules. For entities 102 at branch locations, it is the edge router 104 responsibility to register itself for network access, and to associate entities 102 with unique identifiers.

In addition to unique identifier assignment, entity registration is also used to share ephemeral access keys, required to establish encrypted tunnels to gateway 206.

For ZTA to enhance security transparently to entities 102, special attention needs to be directed towards configuration management options. While many technical or repetitive configuration details may be hidden behind graphical user interfaces and templates, the policies need to be represented in a format that minimizes opportunities for configuration mistakes.

The access policy management 406 is provided via an API, where policies can be defined according to Role Based Access Control (RBAC) schemes or any other schemes known in the art. Assigning policies to various roles, and assigning roles to entities 102 or groups of entities 102, allows for configurational flexibility and ease of administration.

In one embodiment, the policies are based on static IP address filters, such as subnet filters, to either allow or deny requests. Additional policies to restrict access to higher-level services or applications can also be used (e.g., L7 filters).

Policy evaluation and enforcement will be handled by a data plane module, integrated within the packet processing and routing 302 engine of the gateway 206. These modules match the unique entity 102 identifiers with configured access policies. As all traffic between the user and the access gateway is encrypted, the authenticity of the packet contents can be verified. The result of the policy evaluation may be either allowed or denied, where denial may happen in either passive fashion by dropping packets, or actively by sending a response for the protocol in question (e.g. TCP RST or HTTP Forbidden).

The mapping of entities 102 identity to their access roles, and roles to policies, is done by a policy engine 408. As policies are managed via API calls, any applicable changes are propagated only to access gateways of concern. The control plane service running on the gateway 206 configures appropriate data plane modules in real-time, updating the lookup tables used by the data plane modules.

In another embodiment, caching of policy verdicts for individual packet flows is done to ensure acceptable performance. Policy evaluations during packet processing must be kept fast using static policies, with table lookups optimized for quick access. Any advanced threat vector identification may need to happen out-of-band, with dynamic revocation of the cached verdicts.

Networking components are collecting and reporting monitoring data and usage logs. Hence, a cluster of nodes need to be provisioned to consume events, acting as distributed event brokers 410. These clusters may need to be scaled horizontally at run-time, with flexibility to buffer events until other services consume them. Optionally, industry standard solutions for the distributed event streaming can be used.

The system provides the foundation for enforcing a great variety of static ZTNA policies suitable for remote access and private networking. However, when policing access to the internet, static policies fall short both in terms of configurational flexibility as well as threat management. Threat vectors may be presented originating from private resources accessing the internet, as well as compromised remote agents connecting to private resources.

A security analytics 412 module can be used to recognize attacks of malicious insiders or compromised remote agents are both quite difficult without a vast amount of data to analyze. In another embodiment, the context of the request, optionally combined with logs of previous requests are used for risk assessment. A machine learning based algorithm can be trained on real data. In another embodiment, 3rd party analytics platforms can be used to complement such analysis on the data collected.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A system for access policy management of a plurality of valid entities communicating over a network comprising:

a server executing an authentication application programming interface (API) for registration and authentication of said entities;
one or more encrypted tunnels between entities; and
one or more gateways;
wherein said server authenticates and registers each entity and assigns a private IP address to each authenticated entity and propagates said private IP address and one or more associated access policies to each of said one or more gateways; and
said one or more gateways processing and routing a plurality of packets received from each of said entities and enforcing, by respective data plane modules associated with said one or more gateways, said one or more access policies associated with the private IP address assigned to the each of said authenticated entities; and
said one or more gateways managing routes based on the private IP addresses of each authenticated entities and routes packets to reach one or more remote entities via one or more tunnels to one or more other gateways creating a network overlay between authenticated entities.

2. The system of claim 1 further comprising an edge router performing the authentication and registration for said entities.

3. A method for access policy management of a plurality of entities communicating over a network comprising:

managing one or more encrypted tunnels between entities and one or more gateways;
authenticating and registering said entities by a server;
assigning, by said server, a private IP address to each authenticated entities and propagating said private IP address and associated access policies to each of said one or more gateways; and
processing and routing, by each of said one or more gateways, a plurality of packets received from each entity and enforcing one or more access policies, using a data plane module coupled to the gateway, associated with the private IP address assigned to the authenticated entity; and
managing, by said one or more gateways, routes based on the private IP addresses of each authenticated entities and routing packets to reach one or more remote entities via one or more tunnels to one or more other gateways creating a network overlay between authenticated entities.

4. The method of claim 3 further comprising performing, by an edge router, the authentication and registration for said entities.

5. The system of claim 1 wherein said data plane module matches the private IP address of each entity with configured access policies.

6. The method of claim 3 wherein said data plane module matches the private IP address of each entity with configured access policies.

\* \* \* \* \*